United States Patent
Marrero

(10) Patent No.: US 11,852,234 B1
(45) Date of Patent: Dec. 26, 2023

(54) DRIVE CHAIN CLEANING AND LUBRICATING DEVICE

(71) Applicant: Leonardo Marrero, North Fort Myers, FL (US)

(72) Inventor: Leonardo Marrero, North Fort Myers, FL (US)

(*) Notice: Subject to any disclaimer, the term of this patent is extended or adjusted under 35 U.S.C. 154(b) by 212 days.

(21) Appl. No.: 17/480,973

(22) Filed: Sep. 21, 2021

(51) Int. Cl.
*F16H 57/05* (2006.01)
*A46B 7/00* (2006.01)
*B62J 50/16* (2020.01)

(52) U.S. Cl.
CPC ............... *F16H 57/05* (2013.01); *A46B 7/00* (2013.01); *B62J 50/16* (2020.02); *A46B 2200/20* (2013.01); *A46B 2200/3073* (2013.01)

(58) Field of Classification Search
CPC .. F16H 57/05; B62J 50/16; A46B 7/00; A46B 2200/3073; A46B 2200/20
USPC ........................................................ 184/15.1
See application file for complete search history.

(56) References Cited

U.S. PATENT DOCUMENTS

| | | | | |
|---|---|---|---|---|
| 1,277,656 A * | 9/1918 | Smith | ...................... | F16H 57/05 184/16 |
| 4,169,427 A * | 10/1979 | Crump | .................... | B08B 1/008 134/172 |
| 4,578,120 A * | 3/1986 | Chiarella | ................. | B62J 31/00 134/40 |
| 4,593,923 A * | 6/1986 | Thalmann | ................ | B62J 31/00 184/15.1 |
| 4,891,037 A * | 1/1990 | Maples | ..................... | B62J 31/00 184/15.1 |
| 5,213,180 A * | 5/1993 | Masonek | ................. | B62J 31/00 184/15.3 |
| 5,360,084 A * | 11/1994 | Graf | ......................... | B08B 1/02 184/15.3 |
| 5,595,262 A * | 1/1997 | Martin | ...................... | F16N 7/38 280/288.4 |
| 6,257,369 B1 * | 7/2001 | Pesl | ......................... | F16N 7/00 184/15.3 |
| 6,942,409 B2 * | 9/2005 | Barbieri | .................. | A46B 7/10 401/9 |
| 9,028,351 B1 * | 5/2015 | Rodriguez | .............. | B62J 31/00 474/91 |

(Continued)

*Primary Examiner* — Michael R Mansen
*Assistant Examiner* — Mark K Buse
(74) *Attorney, Agent, or Firm* — SANCHELIMA & ASSOCIATES, P.A.; Christian Sanchelima; Jesus Sanchelima

(57) ABSTRACT

A drive chain cleaning and lubricating device including an enclosure assembly, a hose assembly, a brush assembly, and a vehicle assembly is disclosed. These assemblies provide a solution for cleaning and lubricating drive chains. The enclosure assembly includes an opening at opposite distal ends to allow the enclosure body to close around a drive chain. The enclosure assembly includes a hose receiving member located opposite of each other on a top enclosure body and a bottom enclosure body. The hose receiving members can be used to supply lubricant or cleaning solution to the inside of the enclosure as well as provide drainage to the enclosure. The enclosure assembly also includes a brush assembly housed therein. The brush assembly includes a permeable brush mounted to the center of the top and bottom enclosure bodies. The permeable brush allows fluid to flow through the brush as the chain passes through the enclosure.

9 Claims, 4 Drawing Sheets

(56) References Cited

U.S. PATENT DOCUMENTS

| | | | | |
|---|---|---|---|---|
| 9,334,947 | B2* | 5/2016 | Varghese | F16H 57/05 |
| 2010/0101607 | A1* | 4/2010 | Feldstein | B62J 31/00 |
| | | | | 134/95.1 |
| 2014/0213399 | A1* | 7/2014 | Varghese | B62J 31/00 |
| | | | | 474/92 |
| 2016/0138703 | A1* | 5/2016 | Doran | F16H 57/05 |
| | | | | 29/428 |
| 2020/0018467 | A1* | 1/2020 | De Mol | F21V 23/002 |

* cited by examiner

DRIVE CHAIN CLEANING AND LUBRICATING DEVICE

BACKGROUND OF THE INVENTION

1. Field of the Invention

The present invention relates to a drive chain cleaning and lubricating device and more particularly, to a drive chain cleaning and lubricating device including an enclosure that closes around the drive chain.

2. Description of the Related Art

Several designs for a drive chain cleaning and lubricating device have been designed in the past. None of them, however, include an enclosure with internally mounted bristles made to come into close contact with the chain when the enclosure is closed.

Applicant believes that a related reference corresponds to U.S. Pat. No. 9,334,947 for a brush apparatus for cleaning and lubricating a drive chain of a motorcycle. Applicant believes another related reference corresponds to U.S. Pat. No. 9,028,351 for an apparatus that encases the chain and sprocket of a motorcycle for cleaning and lubrication. None of these references, however, teach of a drive chain cleaning and lubricating device that encases the drive chain while including a solvent input channel and a drain output channel to provide a more effective cleaning and lubrication method.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a drive chain cleaning and lubricating device that includes an enclosure to encase the drive chain.

It is another object of this invention to provide a drive chain cleaning and lubricating device that includes an enclosure with a solvent or lubricant input opening as well as a drain opening.

It is still another object of the present invention to provide a drive chain cleaning and lubricating device that includes an enclosure with brushes internally mounted that clean and apply lubricant to the drive chain more efficiently.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
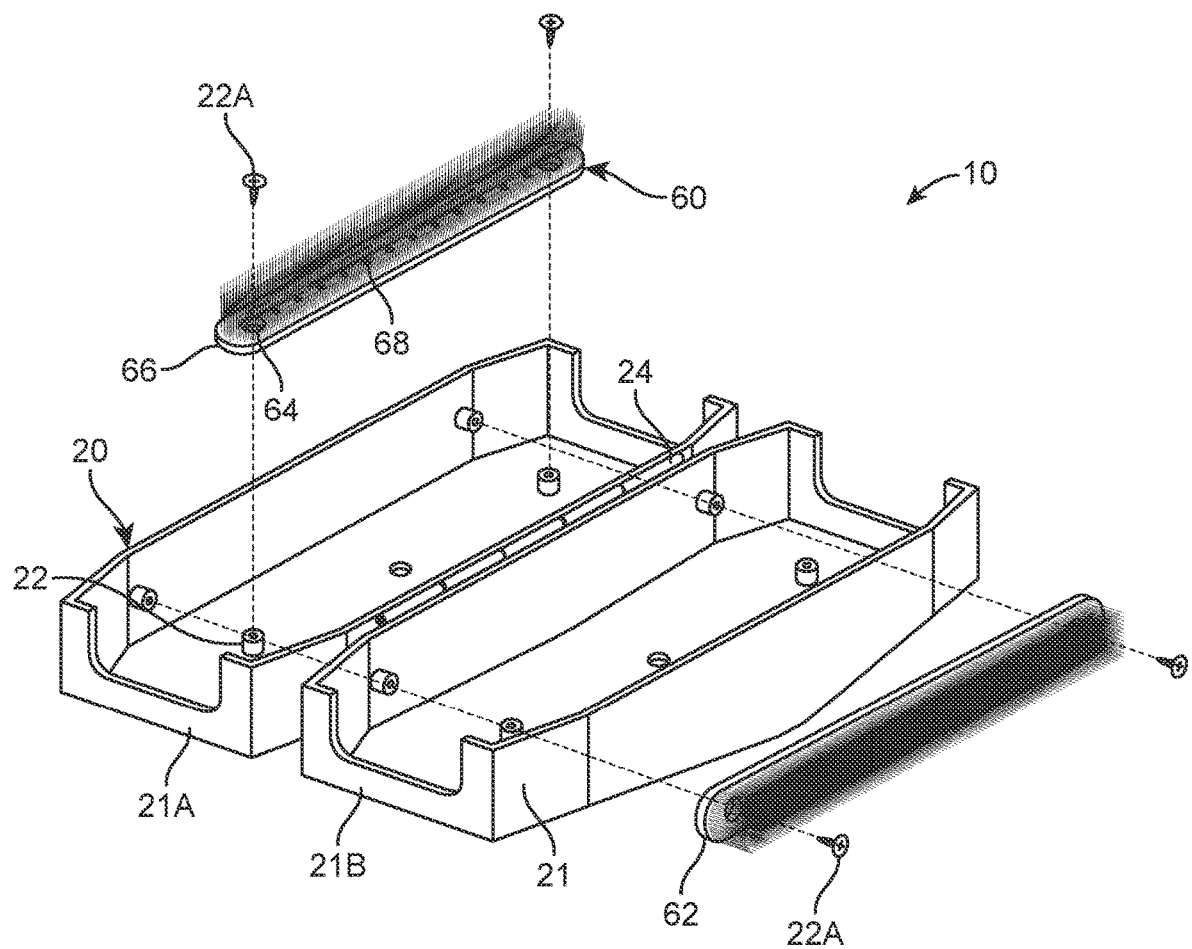
FIG. 1 represents an exploded view of enclosure assembly 20 in an open configuration with brush assembly 60 mounting points visible.

Referring now to the drawings, where the present invention is generally referred to with numeral 10, it can be observed that it basically includes an enclosure assembly 20, a hose assembly 40, a brush assembly 60, and a vehicle assembly 80.

Figure 3:
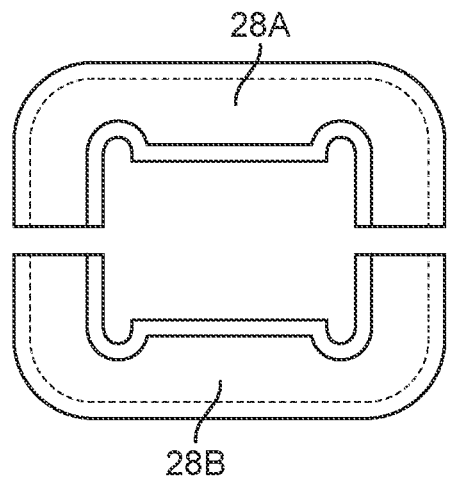
FIG. 3 illustrates a front view of top guide drive chain 28A and bottom drive chain guide 28B.
Figure 4:
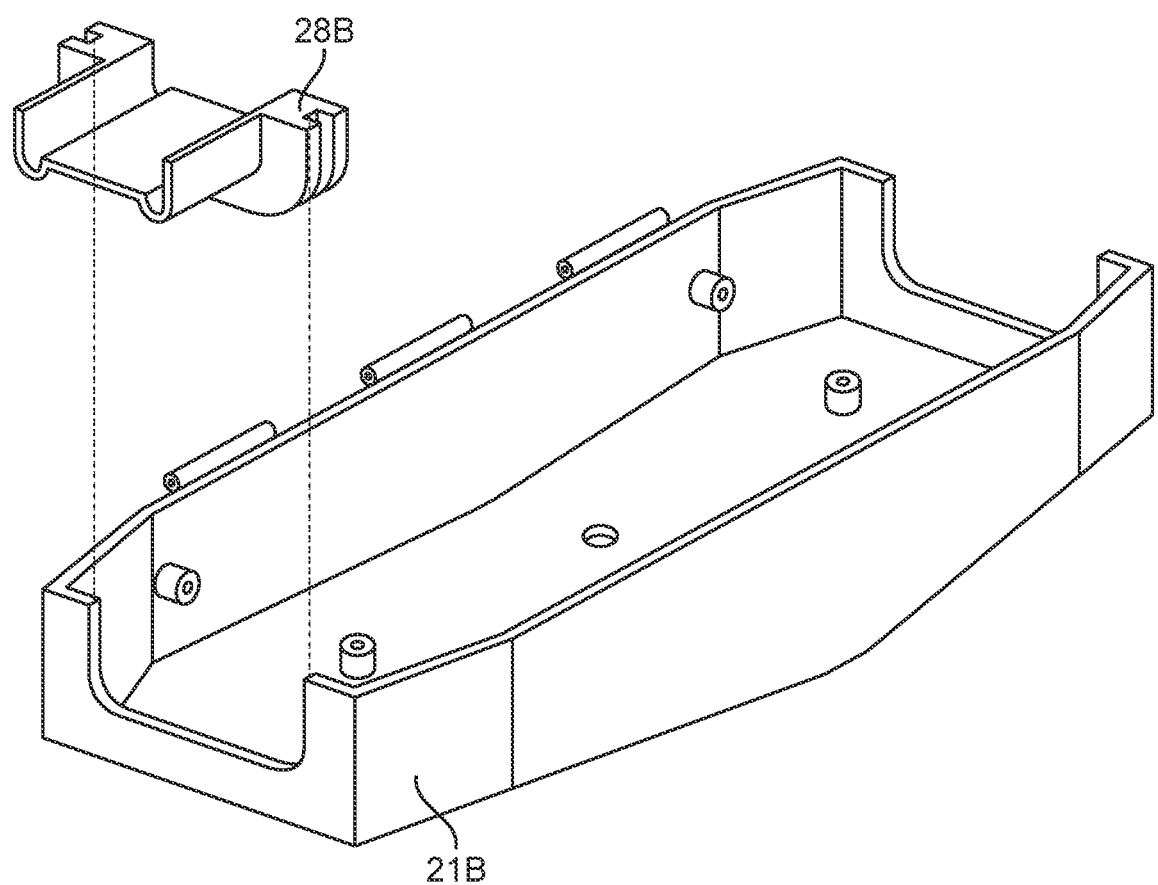
FIG. 4 is a representation of an isometric view of bottom drive chain guide 28B engaging with bottom enclosure body 21B.

As best illustrated in FIG. 1, enclosure assembly 20 may include an enclosure body 21. Enclosure body 21 may include a top enclosure body 21A hingedly mounted to a bottom enclosure body 21B via a hinge 24. In one embodiment the bottom enclosure body 21B may have a substantially rectangular shape. The bottom enclosure body 21B may have its four corners chamfered. The bottom enclosure body 21B may include a top portion and a bottom portion. The bottom enclosure body 21B may include an interior and an exterior. The top portion may be an opening into the interior of the bottom enclosure body 21B. The bottom enclosure body 21B may include a bottom wall having a V-shape and two lateral walls cut to conform to edges of the bottom wall. A top edge of a lateral wall of the bottom enclosure body may be a mounting point for a hinge 24. The bottom enclosure body 21B may also include a front face wall and a rear face wall. The front face wall and rear face wall may be opposite one another on the distal ends of bottom enclosure body 21B. The front face wall and rear face wall may create a U-shaped opening joined on its lateral edges to the edges of the lateral walls of bottom enclosure body 21B. The bottom edge of the front face wall and rear face wall may be joined to the bottom portion of enclosure body 21B. The bottom portion of bottom enclosure body 21B may also include a centrally located opening that is the interior of a hose receiving member 44. The interior of the bottom enclosure body 21B may include a fastener protrusion 22. Fastener protrusion 22 may be hollow cylindrical members protruding perpendicularly from the lateral wall and bottom portion towards the interior of bottom enclosure body 21B. Fastener protrusion 22 may receive a fastener 22A and serve as mounting points for brush assembly 60. The top enclosure body 21A may have a rectangular prism shape. Apart from the shape, it should be understood that the bottom enclosure body 21B and the top enclosure body 21A are identical As best demonstrated in FIG. 3-4 the U-shaped opening of bottom enclosure body 21B may receive a top drive chain guide 28A and a bottom drive chain guide 28B. Top drive chain guide 28A and bottom drive chain guide 28B may be identical pairs. The bottom drive chain guide 28B may have a U-shaped channel that is mounted via pressure and engages with the U-shaped opening of the front face wall and rear face wall of the bottom enclosure body 21B. Alternatively the bottom drive chain guide may also be mounted to bottom enclosure body 21B adhesively. When the bottom drive chain guide 28B is engaged with bottom enclosure body 21B said bottom drive chain guide 28B may include a perpendicularly outward protruding U-shaped wall with respect to the front face wall and rear face wall. The perpendicularly outward protruding wall of the bottom drive chain guide 28B may be beneficial in cradling a drive chain 82 as it passes through the interior of enclosure assembly 20. The cradling of the drive chain 82 by bottom drive chain guide 28B may prevent the drive chain 82 from snagging any portion of the enclosure front face wall or rear face wall. As shown in FIG. 3 it may be preferable for bottom drive chain guide 28B and top drive chain guide 28A to be identical pairs. As such, bottom drive chain guide 28B will engage with its respective bottom enclosure body 21B front face wall and rear face wall and top drive chain guide 28A will engage with its respective top enclosure body 21A front face wall and rear face wall.

Figure 2:
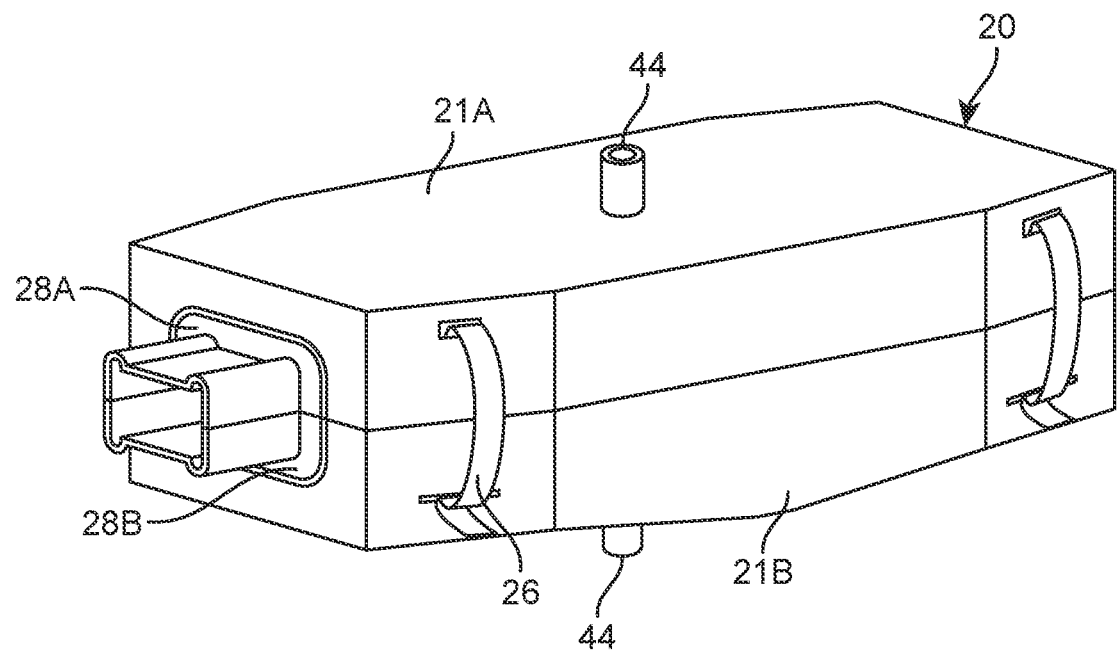
FIG. 2 shows enclosure assembly 20 in a closed configuration with hose receiving member 44 protruding from top enclosure body 21A and bottom enclosure body 21B.

As best depicted in FIG. 2 enclosure body assembly 20 may include a closed configuration. In this closed configuration top enclosure body 21A may be hingedly engaged to the top portion of bottom enclosure body 21B. This closed configuration may align the wall edges of top enclosure body 21A to the wall edges of bottom enclosure body 21B as they mirror one another. It can also be observed that when the enclosure assembly 20 is in a closed configuration the top drive chain guide 28A and the bottom drive chain guide 28B mirror each other as well. In one embodiment it may be suitable to secure enclosure assembly 20 in a closed configuration via an enclosure clip 26. In one iteration enclosure clip 26 may be a metal clasp mounted to the exterior lateral wall of top enclosure body 21A with an enclosure clip 26 securing point at the exterior lateral wall of bottom enclosure body 21B. Thereby, maintaining top enclosure body 21A and bottom enclosure body 21B engaged to each other in the closed configuration.

Figure 5:
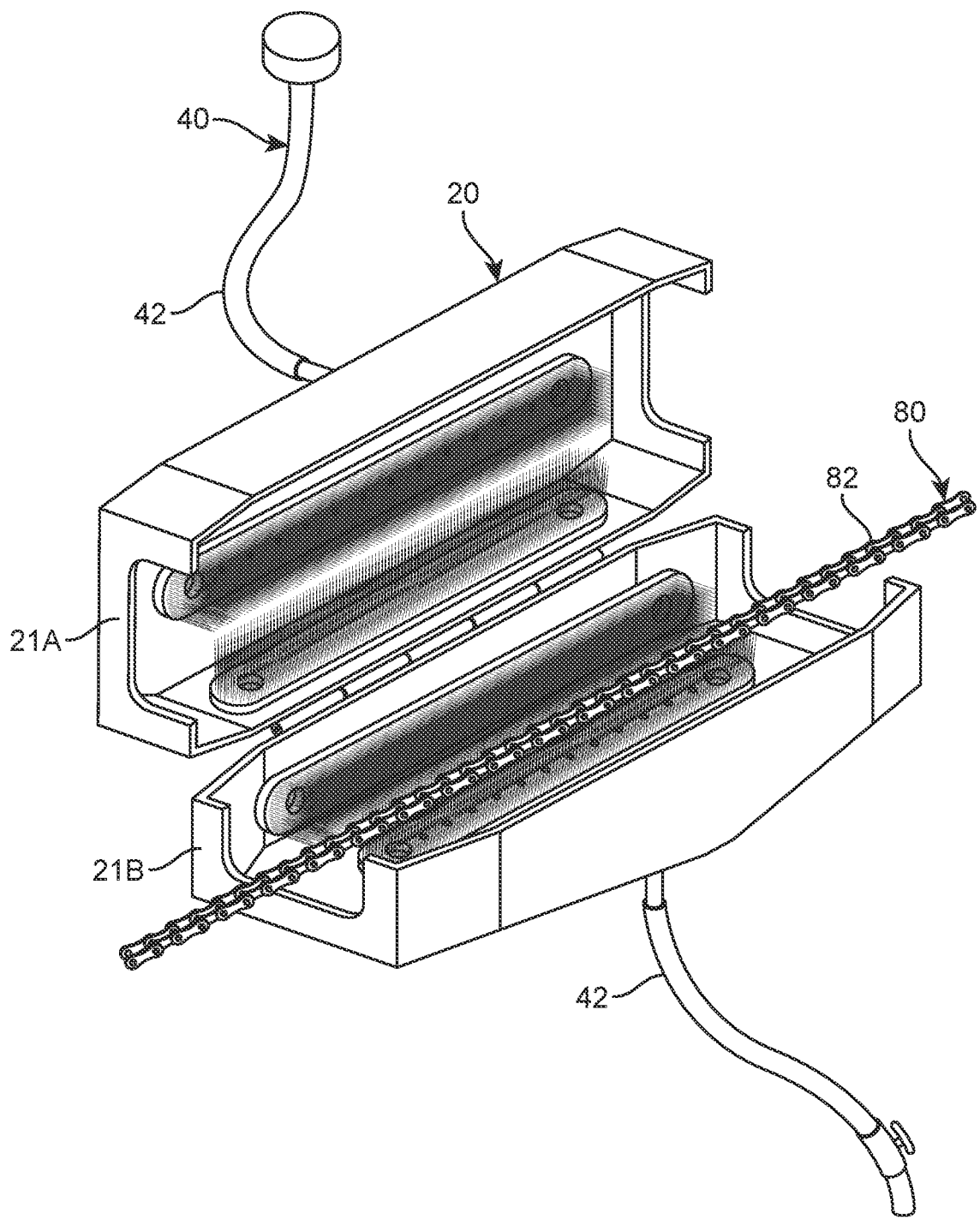
FIG. 5 depicts an operational view of drive chain 82 within enclosure assembly 20.

As shown in FIG. 5 the present invention may include a hose assembly 40. Hose assembly 40 may include a hose 42, and a hose receiving member 44. In one embodiment hose receiving member 44 may be a hollow cylindrical protrusion extending outward from the exterior of the bottom portion of bottom enclosure body 21B. In FIG. 2 it can be observed that hose receiving member 44 may be centrally located on the exterior of top enclosure body 21A as well. The hose receiving member 44 may create an opening from the interior of bottom enclosure body 21B and top enclosure body 21A to their respective exteriors. The hose receiving member 44 may receive a hose 42 to be mounted via pressure. It may also be suitable for hose 42 to be mounted adhesively to hose receiving member 44. Although identical in structure, the hose receiving member 44 mounted to bottom enclosure body 21B may differ in function from the hose receiving member 44 mounted to the top enclosure body 21A. The hose receiving member 44 mounted to the top enclosure body 21A may serve as an entryway for cleaning solutions or lubricants to the interior of enclosure assembly 20 via a hose 42. The hose receiving member 44 mounted to the bottom enclosure body 21B may serve as drainage for excess cleaning solutions or lubricants, further helped by the V-shaped bottom wall of the bottom enclosure body 21B. The bottom wall assists the hose receiving member 44 of the bottom enclosure body 21B in assuring no cleaning solutions or lubricants stay inside the enclosure body 21.

Referring now to FIG. 1 the present invention may also include a brush assembly 60. Brush assembly 60 may include a side brush 62, and a fastener opening 64. Side brush 62 may include a flat portion and a bristle portion. The flat portion of side brush 62 may be an elongated stadium shape spanning the interior length of a continuous lateral wall of bottom enclosure body 21B. Wherein the fastener opening 64 creates a through hole on the flat portion of side brush 62 that aligns with the fastener protrusion 22. Side brush 62 may be mounted to the interior lateral walls of bottom enclosure body 21B via fastener protrusion 22 and fastener 22A. The bottom portion of bottom enclosure body 21B may serve as a mounting point for a permeable brush 66 via fastener protrusion 22 and fastener 22A. Permeable brush 66 may include permeable brush drainage holes 68 lining a lateral center line. The lateral center line of permeable brush 66 may allow for fluids to permeate more efficiently past the permeable brush 66 and by extension throughout the interior of enclosure assembly 20. In one embodiment permeable brush 66 may be an elongated stadium shape as well with its center lateral line slope towards the interior of enclosure assembly 20. The positioning of side brush 62 and permeable brush 66 with respect to bottom enclosure body 21A and top enclosure body 21A may be mirrored to each other when enclosure assembly 20 is in a closed configuration.

As shown in the operational view of FIG. 5 the present invention may include a drive chain 82 of vehicle assembly 80. The drive chain 82 may be placed on the interior of enclosure 21 along the length of bottom enclosure body 21B. When enclosure assembly 20 is in a closed configuration top enclosure body 21A and bottom enclosure body 21B may encase drive chain 82. As the drive chain 82 passes through the interior of the enclosure assembly 20 the top drive chain guide 28A and the bottom drive chain guide 28B may provide a smoother transition for the drive chain 82 from the exterior of the enclosure assembly 20 to the interior. While the drive chain 82 is inside the enclosure assembly 20 it may come into close contact with the side brush 62 and the permeable brush 66. Thereby helping to clean debris and or lubricate the drive chain 82 depending on the cleaning fluid or lubricant flowing through hose receiving member 44 via hose 42.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a drive chain cleaning and lubricating device, comprising:
   a. an enclosure assembly including a top enclosure body hingedly mounted to a bottom enclosure body, thereby defining a hollow interior, said top enclosure body and said bottom enclosure body defines an enclosure body, wherein each of said bottom enclosure body and said top enclosure body has four corners, wherein each corner of the four corners of said bottom enclosure body and said top enclosure body are chamfered, wherein said top enclosure body and said bottom enclosure body with a rectangular shape featuring a U-shaped hollow body match against each other when abutting therebetween, wherein a distal end of said U-shaped bottom enclosure body and said U-shaped top enclosure body are adapted to receive a bottom drive chain guide and a top drive chain guide respectively; and
   b. a hose assembly including a hose receiving member mounted to an exterior of said top enclosure body and an exterior of the bottom enclosure body, wherein said hose receiving member forms a hollow cylindrical protrusion extending from an exterior of the top enclosure body and said bottom enclosure body respectively, wherein an opening of said hollow cylindrical protrusions extends into an interior of said enclosure body respectively; and c. a brush assembly including a permeable brush, said permeable brush including drainage holes lining the permeable brush, wherein said permeable brush is mounted horizontally on the interior of the enclosure assembly with said drainage holes in alignment with the through hole of said hose receiving member.

2. The system for a drive chain cleaning and lubricating device of claim 1, wherein said top drive chain guide and said bottom drive chain guide have a U-shaped channel that engages the drive chain guide to the U-shaped of the distal end of said bottom enclosure body and said top enclosure body respectively.

3. The system for a drive chain cleaning and lubricating device of claim 1, wherein a lateral exterior side of said top enclosure body and a lateral exterior side of the bottom enclosure body is a mounting point for at least one enclosure clip.

4. The system for a drive chain cleaning and lubricating device of claim 1, wherein said drainage holes extend about a central length of the permeable brush.

5. The system for a drive chain cleaning and lubricating device of claim 1, wherein said permeable brush with an elongated oval shape integrates vertical fastener openings positioned near by the ends thereof to fasten said permeable brush along an interior of said top enclosure body and said bottom enclosure body.

6. The system for a drive chain cleaning and lubricating device of claim 1 wherein a side brush with fastener openings is mounted perpendicularly with respect to said permeable brush through fastener protrusions on an interior lateral wall of the top enclosure body and the bottom enclosure body.

7. The system for a drive chain cleaning and lubricating device of claim 1, wherein said top drive chain guide and said bottom drive chain guide integrates an extended portion respectively to receive the drive chain, preventing from snagging said drive chain against any portion of said enclosure body.

8. The system for a drive chain cleaning and lubricating device of claim 1, wherein said receiving member of said top enclosure body and said bottom enclosure body are positioned parallel with respect to said permeable brush respectively.

9. The system for a drive chain cleaning and lubricating device of claim 1, wherein said receiving member spread a cleaning solution to said permeable brush by means of said permeable brush drainage holes.

* * * * *